(12) United States Patent
Hung

(10) Patent No.: US 6,794,455 B2
(45) Date of Patent: Sep. 21, 2004

(54) COAGENTS FOR FLUOROELASTOMER FREE RADICAL-CURABLE COMPOSITIONS

(75) Inventor: Ming-Hong Hung, Wilmington, DE (US)

(73) Assignee: DuPont Dow Elastomers, Wilmington, DE (US)

( * ) Notice: Subject to any disclaimer, the term of this patent is extended or adjusted under 35 U.S.C. 154(b) by 0 days.

(21) Appl. No.: 10/317,827

(22) Filed: Dec. 12, 2002

(65) Prior Publication Data

US 2004/0116611 A1 Jun. 17, 2004

(51) Int. Cl.$^7$ .............................................. C08F 114/18
(52) U.S. Cl. ................ 525/326.2; 525/281; 525/330.9; 525/326.3; 524/544; 548/429
(58) Field of Search ............................ 525/326.2, 281, 525/330.9, 326.3; 548/429; 524/544

(56) References Cited

U.S. PATENT DOCUMENTS

| 4,121,001 A | | 10/1978 | Gotcher et al. |
| 4,214,060 A | | 7/1980 | Apotheker et al. |
| 4,243,770 A | | 1/1981 | Tatemoto et al. |
| 4,948,852 A | * | 8/1990 | Moore .......................... 526/247 |
| 4,983,680 A | * | 1/1991 | Ojakaar ........................ 525/281 |
| 6,054,554 A | * | 4/2000 | Choi et al. .................... 528/353 |
| 6,191,233 B1 | | 2/2001 | Kishine et al. |
| 6,277,937 B1 | * | 8/2001 | Duvalsaint et al. ......... 526/255 |
| 6,281,296 B1 | | 8/2001 | MacLachlan et al. |
| 2002/0145228 A1 | * | 10/2002 | Kolb et al. .................. 264/236 |

FOREIGN PATENT DOCUMENTS

| CA | 2067891 | | 11/1992 |
| JP | 63-291933 | * | 11/1988 |
| WO | WO 9705122 | | 2/1997 |

* cited by examiner

Primary Examiner—David W. Wu
Assistant Examiner—Henry S. Hu

(57) ABSTRACT

Crosslinking coagents based on aromatic diimides having N-substituted allyl groups are employed in place of triallyl isocyanurate (TAIC) for the free radical curing of fluoroelastomers. The diimide coagents mix more easily with fluoroelastomers and are less likely to homopolymerize than TAIC. Thus mold fouling and sticking due to low molecular weight polymers of coagent is greatly reduced.

13 Claims, No Drawings

COAGENTS FOR FLUOROELASTOMER FREE RADICAL-CURABLE COMPOSITIONS

FIELD OF THE INVENTION

This invention pertains to free radical-curable fluoroelastomer compositions which contain coagents based on aromatic imides having pendant allyl groups for the formation of crosslinks between fluoroelastomer polymer chains.

BACKGROUND OF THE INVENTION

Fluoroelastomers are items of commerce, being employed in a variety of end use applications where chemical or thermal resistance is important. They are especially useful as seals. These elastomers are normally crosslinked when formed into their final part shapes. It is desirable for the crosslinks to have at least as much chemical and thermal stability as the fluoroelastomers themselves.

One method of forming crosslinks is via a free radical mechanism, commonly initiated by such means as a peroxide or ultraviolet (UV) light. Fluoroelastomers that can be crosslinked by a free radical mechanism often contain cure sites along the polymer chain, at chain ends, or both. Typical cure sites are bromine, chlorine, Iodine or nitrile groups. See for example U.S. Pat. Nos. 4,214,060; 4,243,770; and 4,983,680. A multifunctional coagent, having multiple sites of unsaturation (e.g. triallyl isocyanurate (TAIC)), is employed to form the actual crosslinks between fluoroelastomer polymer chains.

Although TAIC is the most frequently employed commercial coagent for free radical curing of fluoroelastomers, it has some disadvantages. First, under typical curing conditions, it undergoes a competitive reaction wherein TAIC homopolymerizes, rather than forming crosslinks with the elastomer. Thus, the cure state and physical properties (i.e. tensile strength and compression set resistance) of the resulting cured fluoroelastomer part are not as good as they would have been had all the TAIC present resulted in crosslinks. Another problem with TAIC is its limited compatibility with fluoroelastomers. During press cure, TAIC may come to the surface of the shaped fluoroelastomer part. This results in fewer crosslinks within the part. Also, the TAIC at the surface may homopolymerize to form a sticky substance which adversely affects mold release. An additional disadvantage of TAIC is that it may not be as thermally stable as the fluoroelastomer that it is crosslinking. Thus, the vulcanized elastomer may be subject to thermal decomposition at the crosslinks. Lastly, TAIC is difficult to mix with fluoroelastomer compositions.

Others (U.S. Pat. No. 6,191,233 B1) have tried to overcome some of these deficiencies by partially fluorinating the TAIC, thus making it more compatible with the fluoroelastomer. However, the fluorinated TAIC is still capable of homopolymerizing and, thus, a further improvement in coagent would be welcomed.

Japanese Kokai Patent Application 63-291933 discloses the use of certain N,N-diallylbiphenyl tetracarboxydiimides as coagents for peroxide curable elastomers such as ethylene/propylene copolymers, polybutadienes, polyisoprene, butyl rubber and styrene copolymers. These coagents are more thermally stable than TAIC.

SUMMARY OF THE INVENTION

An object of the present invention is to provide a thermally stable coagent for the efficient free radical curing of fluoroelastomers wherein said coagent does not readily homopolymerize under curing conditions and wherein said coagent is compatible and mixes well with the fluoroelastomer. Accordingly, an aspect of the present invention is a free radical-curable composition comprising:

A) fluoroelastomer having cure sites selected from the group consisting of bromine atoms, chlorine atoms, iodine atoms, nitrile groups, non-conjugated dienes, and mixtures of two or more thereof; and B) a coagent having the general formula

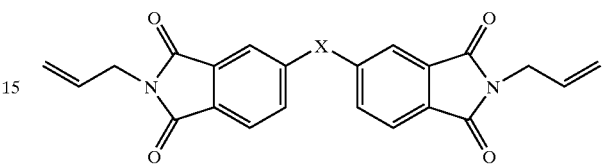

where X is $C(CF_3)_2$, $C(Rf)_2$, $(CF_2)_n$, O, CO, S, or Rf'; and wherein Rf is a $C_1$–$C_4$ perfluoroalkyl group, Rf' is a perfluorooxyalkylene group having 2 to 4 carbon atoms, and n is an integer from 1 to 8.

Another aspect of the present invention is a coagent of the formula

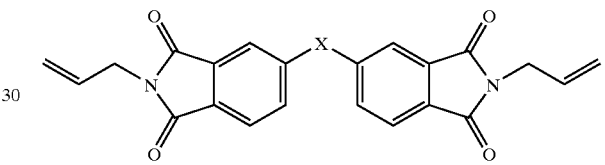

where X is $C(CF_3)_2$.

DETAILED DESCRIPTION OF THE INVENTION

Fluoroelastomers suitable for use as the elastomeric component of the compositions of the invention include fluoroelastomers comprising copolymerized units of one or more monomers containing fluorine, such as vinylidene fluoride, hexafluoropropylene, 1-hydropentafluoropropylene, 2-hydropentafluoropropylene, tetrafluoroethylene, chlorotrifluoroethylene, and perfluoro(alkyl vinyl ether), as well as other monomers not containing fluorine, such as ethylene, and propylene. Elastomers of this type are described in Logothetis, *Chemistry of Fluorocarbon Elastomers*, Prog. Polym. Sci., Vol.14, 251–296 (1989). The polymers may be prepared by polymerization of the appropriate monomer mixtures with the aid of a free radical generating initiator either in bulk, in solution in an inert solvent, in aqueous emulsion or in aqueous suspension. The polymerizations may be carried out in continuous, batch, or in semi-batch processes. General preparative processes are disclosed in the Logothetis article and in U.S. Pat. Nos. 4,281,092; 3,682,872; 4,035,565; 5,824,755; 5,789,509; 3,051,677; and 2,968,649.

Specific examples of such fluoroelastomers include, but are not limited to copolymers of vinylidene fluoride and hexafluoropropylene and, optionally, tetrafluoroethylene; copolymers of vinylidene fluoride and chlorotrifluoroethylene; copolymers of vinylidene fluoride, hexafluoropropylene, tetrafluoroethylene and chlorotrifluoroethylene; copolymers of vinylidene fluoride and a perfluoro(alkyl vinyl ether) and, optionally, tetrafluoroethylene; copolymers of tetrafluoroethylene and propylene and, optionally, vinylidene fluoride; and copolymers of tetrafluoroethylene and perfluoro(alkyl vinyl ether), preferably perfluoro(methyl vinyl ether). Each of the fluoroelastomers of the composition of the invention also comprises at least one halogenated cure site or a reactive double bond resulting from the presence of a copolymerized unit of a non-conjugated diene. The halogenated cure sites may be copolymerized cure site monomers or halogen atoms that are present at terminal positions of the fluoroelastomer polymer chains. The cure site monomers, reactive double bonds or halogenated end groups are capable of reacting to form crosslinks. The cure site monomers are selected from the group consisting of brominated, chlorinated, and iodinated olefins; brominated, chlorinated, and iodinated unsaturated ethers and non-conjugated dienes.

The brominated cure site monomers may contain other halogens, preferably fluorine. Examples are bromotrifluoroethylene, 4-bromo-3,3,4,4-tetrafluorobutene-1 and others such as vinyl bromide, 1-bromo-2,2-difluoroethylene, perfluoroallyl bromide, 4-bromo-1,1,2-trifluorobutene, 4-bromo-1,1,3,3,4,4,-hexafluorobutene, 4-bromo-3-chloro-1,1,3,4,4-pentafluorobutene, 6-bromo-5,5,6,6-tetrafluorohexene, 4-bromoperfluorobutene-1 and 3,3-difluoroallyl bromide. Brominated unsaturated ether cure site monomers useful in the invention include ethers such as 2-bromo-perfluoroethyl perfluorovinyl ether and fluorinated compounds of the class $CF_2Br-R_f-O-CF=F_2$, such as $CF_2BrCF_2O-CF=CF_2$, and fluorovinyl ethers of the class $ROCF=CFBr$ or $ROCBr=CF_2$, where R is a lower alkyl group or fluoroalkyl group, such as $CH_3OCF=CFBr$ or $CF_3CH_2 OCF=CFBr$.

Iodinated olefins may also be used as cure site monomers. Suitable iodinated monomers include iodinated olefins of the formula: $CHR=CH-Z-CH_2CHR-I$, wherein R is —H or —$CH_3$; Z is a $C_1$–$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2CF_2O[CF(CF_3)CF_2O]_nCF=CF_2$, and the like, wherein n=1–3, such as disclosed in U.S. Pat. No. 5,717,036. In addition, suitable iodinated cure site monomers including iodoethylene, 4-iodo-3,3,4,4-tetrafluorobutene-1;3-chloro-4-iodo-3,3,4,4-trifluorobutene: 2-iodo-1,1,2,2-tetrafluoro-1-(vinyloxy)ethane: 2-iodo-1-(perfluorovinyloxy)-1,1-2,2-tetrafluoroethylene: 1,1,2,3,3,3-hexafluoro-2-iodo-1-(perfluorovinyloxy)propane: 2-iodoethyl vinyl ether; 3,3,4,5,5,5-hexafluoro-4-iodopentene; and iodotrifluoroethylene are disclosed in U.S. Pat. No. 4,694,045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the cure site monomers listed above, preferred compounds include 4-bromo-3,3,4,4-tetrafluorobutene-1, 4-iodo-3,3,4,4-tetrafluorobutene-1, and bromotrifluoroethylene.

Additionally, or alternatively, iodine atoms, bromine atoms or mixtures thereof may be present at the fluoroelastomer polymer chain ends as a result of the use of chain transfer or molecular weight regulating agents during preparation of the fluoroelastomers. Such agents includes iodine-containing compounds that result in bound iodine at one or both ends of the polymer molecules (U.S. Pat. No. 4,243,770). Methylene iodide; 1,4-diiodoperfluoro-n-butane; and 1,6-diiodo-3,3,4,4,tetrafluorohexene are representative of such agents. Others iodinated chain transfer agents include 1,3-diiodoperfluoropropane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane; etc. Particularly preferred are diiodinated chain transfer agents. Examples of brominated chain transfer agents include 1,1-difluoroethane; 1-bromo-3-iodoperfluoropropane; 1-iodo-2-bromo-1,1-difluoroethane and others such as disclosed in U.S. Pat. No. 5,151,492.

Copolymers of ethylene, tetrafluoroethylene, perfluoro (alkyl vinyl ether) and a bromine-containing cure site monomer, such as those disclosed by Moore, in U.S. Pat. No. 4,694,045 are also suitable for use in the present invention. Copolymers of tetrafluoroethylene and perfluoro (alkyl vinyl ether) commonly containing fluorinated nitrile cure sites, such as nitrile group-containing olefins or unsaturated ethers (for example perfluoro(8-cyano-5-methyl-3,6-dioxa-1-octene) and others disclosed in U.S. Pat. No. 6,281,296 B1) may also be used. Other useful fluoroelastomers containing brominated or iodinated olefin cure site monomers are described in U.S. Pat. Nos. 4,035,565; 4,564,662; 4,745,165; 4,694,045; 4,948,852; and 4,973,633.

A coagent for forming crosslinks between fluoroelastomer polymer chains is employed in the compositions of this invention. Typically, the coagent is present in an amount of 0.1 to 10 parts by weight per 100 parts by weight elastomer (phr). Preferably, the coagent is present at a level between 1 and 5 phr. The coagent has the general formula

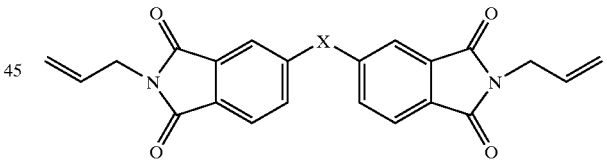

where X is $C(CF_3)_2$, $C(Rf)_2$, $(CF_2)_n$, O, CO, S, or Rf'; and wherein Rf is a $C_1$–$C_4$ perfluoroalkyl group, Rf' is a perfluorooxyalkylene group having 2 to 4 carbon atoms, and n is an integer from 1 to 8. Examples of such coagents include, but are not limited to 5,5'-carbonylbis[2-(2-propenyl)-1H-isoindole-1,3(2H)-dione];

N,N'-bis(2-propenyl)-4,4'-(hexafluoroisopropylidene) diphthalimide (also referred to hereinafter as "6-FDA-Bis (N-Allyl)"); and 5,5'-oxybis[2-(2-propenyl)-1H-isoindole-1, 3(2H)-dione] (also referred to hereinafter as "ODPA-Bis (allyl)"). Preferably X is $C(CF_3)_2$ (i.e. 6-FDA-Bis(N-Allyl)) or O (i.e. ODPA-Bis(allyl)). Most preferably, X is $C(CF_3)_2$, where the presence of the CF3 groups improves the compatibility of the coagent with fluoroelastomer compositions.

The nature of the bridging group X in the above formula makes the coagents employed in the compositions of this invention more flexible than the relatively rigid N,N'-diallylpyromellitic diimide:

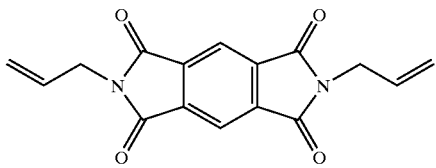

and the N,N'-diallylbiphenyl tetracarboxydiimides disclosed in JP 63-291933, for example

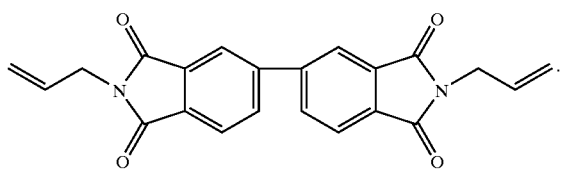

Surprisingly, fluoroelastomer compositions of this invention cure faster and to a higher state of cure than do compositions containing a relatively rigid aromatic diimide coagent.

The aromatic diimide coagents employed in this invention have excellent thermal and chemical resistance. The separation of the two allyl groups by two aromatic rings greatly inhibits homopolymerization. Also, the nature of the planar aromatic ring structure of these coagents facilitates their free radical reaction with cure sites on the fluoroelastomer polymer chains during curing. The aromatic diimide coagents are more thermally stable than TAIC, so vulcanized fluoroelastomers containing these coagents may be less subject to thermal decomposition than vulcanized compositions containing TAIC coagent.

The coagent employed in this invention may readily be prepared in high yield by the reaction of the corresponding acid dianhydride with N-allylamine in glacial acetic acid at a temperature between 90° to 120° C. for 0.5 to 6 hours. The anhydride has the following structure where X, Rf, Rf', and n are as defined above.

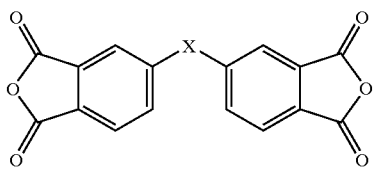

The compositions of the present invention are cured via a free radical mechanism. Free radicals may be generated by several different means such as by the thermal decomposition of an organic peroxide optionally contained in the compositions of this invention, or by radiation such as ultraviolet (UV) radiation.

Compositions of the invention which contain an organic peroxide typically contain between 0.05 and 10 phr, preferably between 1 and 5 phr. Examples of organic peroxides which may be employed in the compositions of the invention include, but are not limited to 1,1-bis(t-butylperoxy)-3,5,5-trimethylcyclohexane; 1,1-bis(t-butylperoxy) cyclohexane; 2,2-bis(t-butylperoxy)octane; n-butyl4,4-bis(t-butylperoxy)valerate; 2,2-bis(t-butylperoxy)butane; 2,5-dimethylhexane-2,5-dihydroxyperoxide; di-t-butyl peroxide; t-butylcumyl peroxide; dicumyl peroxide; alpha,alpha'-bis(t-butylperoxy-m-isopropyl)benzene; 2,5-dimethyl-2,5-di(t-butylperoxy)hexane; 2,5-dimethyl-2,5-di(t-butylperoxy)hexene-3; benzoyl peroxide, t-butylperoxybenzene; 2,5-dimethyl-2,5-di(benzoylperoxy)-hexane; t-butylperoxymaleic acid; and t-butylperoxyisopropylcarbonate. Preferred examples of organic peroxides include 2,5-dimethyl-2,5di(t-butylperoxy)hexane (DBPH), dicumyl peroxide, and alpha,alpha'-bis(t-butylperoxy-m-isopropyl)benzene. The amount compounded is generally in the range of 0.05–5 parts by weight, preferably in the range of 0.1–4 parts by weight per 100 parts by weight of the fluoroelastomer. This particular range is selected because if the peroxide is present in an amount of less than 0.05 parts by weight, the vulcanization rate is insufficient and causes poor mold release. On the other hand, if the peroxide is present in amounts of greater than 5 parts by weight, the compression set of the cured polymer becomes unacceptably high. In addition, the organic peroxides may be used singly or in combinations of two or more types.

Preferably, the compositions of the invention also contain an acid acceptor such as a divalent metal hydroxide, a divalent metal oxide, a strongly basic (i.e. pKa>10) organic amine such as 1,8-bis(dimethylamino)naphthalene (ProtonSponge® available from Aldrich), or a combination of any of the latter. Examples of divalent metal oxides and hydroxides include ZnO, CaO, Ca(OH)$_2$ and MgO. If present in the compositions of the invention, the acid acceptor is typically at a level between 0.1 and 20 phr, preferably between 0.1 and 10 phr.

Optionally, other components, for example fillers such as carbon black, Austin black, graphite, thermoplastic fluoropolymer micropowders, silica, clay, diatomaceous earth, talc, wollastonite, calcium carbonate, calcium silicate, calcium fluoride, and barium sulfate; processing aides such as higher fatty acid esters, fatty acid calcium salts, fatty acid amides (e.g. erucamide), low molecular weight polyethylene, silicone oil, silicone grease, stearic acid, sodium stearate, calcium stearate, magnesium stearate, aluminum stearate, and zinc stearate; coloring agents such as titanium white and iron red may be used as compounding additives in the compositions of this invention. The amount of such filler is generally in the range of 0.1–100 phr, preferably 1–60 phr. The amount of processing aid compounded is generally less than 10 phr, preferably less than 5 phr. The amount of a coloring agent compounded is generally less than 50 phr, preferably less than 30 phr.

The fluoroelastomer, coagent, and any other ingredients are generally incorporated into the curable compositions of the invention by means of an internal mixer or rubber mill. The resulting composition may then be shaped (e.g. molded or extruded) and cured. Curing typically takes place at about 150°–200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded article is heated in an oven or the like for an additional period of about 1-48 hours, typically from about 180°–275°C., generally in an air atmosphere.

The fluoroelastomer compositions of this invention are useful in many industrial applications including seals, wire coatings, tubing and laminates.

EXAMPLES

Test Methods

Physical properties of the compositions described in the examples were measured according to the following test procedures.

| | |
|---|---|
| Mooney Scorch | ASTM D1646 |
| Moving Disc Rheometer (MDR) | ASTM D5289 |
| Tensile Strength ($T_B$) | ASTM D412 |
| Modulus ($M_{100}$) | ASTM D412 |
| Elongation at Break ($E_B$) | ASTM D412 |
| Hardness | ASTM D2240 |
| Compression Set-B | ASTM D395 |

The following fluoroelastomers were used in the examples:
Fluoroelastomer A—a commercially available fluoroelastomer (Viton® GBL-200 from DuPont Dow Elastomers L.L.C.), which is a peroxide-curable vinylidene fluoride, hexafluoropropylene, tetrafluoroethylene copolymer having bromine cure sites.
Fluoroelastomer B—a copolymer of tetrafluoroethylene, perfluoro(methyl vinyl ether) and perfluoro(8-cyano-5-methyl-3,6-dioxa-1-octene) (prepared by the process disclosed in U.S. Pat. No. 5,789,489).

Example 1

N,N'-Bis(2-Propenyl)-4,4'-(Hexafluoroisopropylidene) Diphthalimide [6-FDA-Bis(N-Allyl)] was synthesized in the following manner. A reaction flask was charged with 4,4'-(hexafluoroisopropylidene)diphthalic dianhydride (26.64 g, 60 mmoles) in glacial acetic acid solvent (55 ml). Allyl amine (6.84 g, 124 mmoles) was added slowly to the flask while the reaction mixture temperature was controlled at 15° to 20° C. with external cooling. After addition was complete, the reaction mixture was heated to reflux for 90 min and the liquid gradually turned to clear from cloudy. After cooling, the product mixture was poured into water (450 to 500 ml). The resulting mixture was then brought to boiling briefly. After cooling, product precipitated out from solution and was collected by filtration, washed several times with water, and finally with methanol. Product was then dried in a vacuum oven (150 mm Hg, at room temperature). The white powder product was obtained in 80% yield (25 g). This product (i.e. 6-FDA-Bis(N-Allyl)) had a melting point of 145°–147° C. $^1$H NMR (chloroform-d): δ7.95 (d, J=7.9 Hz, 2H), 7.82 (m, 4H), 5.88 (m, 2H), 5.24 (dd, 4H), 4.32 (d, J=6.5 Hz, 4H); $^{19}$F NMR (Chloroform-d): −63.8 (s, $CF_3$'s). IR (KBr): 3442, 1778, 1721, 1628 cm$^{-1}$.

Example 2

N,N'-Bis(2-Propenyl)-4,4'-Oxydiphthalimide [ODPA-Bis (N-Allyl)] was synthesized in the following manner. A reaction flask was charged with 4,4'-oxydiphthalic dianhydride (21.7 g, 70 mmoles) in glacial acetic acid solvent (120 ml). Allyl amine (7.98 g, 140 mmoles) was added slowly to the flask while the reaction mixture temperature was controlled at 18° to 22° C. with external cooling. After addition was complete, the reaction mixture was heated to reflux (ca. 115° C.) for 90 min and the solution gradually turned to clear from cloudy. After cooling, the product mixture was poured into water (450 to 500 ml), The resulting mixture was then brought to boiling briefly. After cooling, product precipitated out of solution and was collected by filtration, washed several times with water, and finally with methanol. Product was then dried in a vacuum oven (150 mm Hg, room temperature). The white solid product was obtained in 76%. Yield (20.5 g). This product (i.e. ODPA-Bis (N-Allyl)) had a melting point of 134°–136° C. $^1$H NMR (chloroform-d): δ7.90 (d, J=8.2 Hz, 2H), 7.42 (m, 4H), 5.89 (m, 2H), 5.23 (m, 4H), 4.29 (dm, J=5.5 Hz, 4H). IR (KBr): 1771, 1725, 1713 cm$^{-1}$.

Curable compositions of the invention were made by mixing Fluoroelastomer A with the coagents prepared in Example 1 and above, an organic peroxide, zinc oxide acid acceptor and carbon black on a conventional two-roll rubber mill, using standard mixing techniques employed in the elastomer industry. Control curable compositions were made by the same procedure except that a coagent of the prior art, triallyl isocyanurate (TAIC), was used in place of the coagents prepared in Example 1 and above. The compositions of this invention, containing the coagents made in Example 1 and above, were much easier to mix than were the control compositions that contained TAIC coagent. The formulations are shown in Table I.

Curing characteristics were measured by MDR (at 177° C., 0.5° arc, 6 minutes) according to the Test Methods. Stress-strain properties were measured at 230° C. on slabs that had been press cured at 177° C. for 10 minutes, followed by an oven post cure of 24 hours at 232° C. Compression set was measured on -rings that had been cured in the same manner as the slabs. The results are also shown in Table I.

TABLE I

| Formulation, phr | Sample 1 | Sample 2 | Control Sample A | Control Sample B |
|---|---|---|---|---|
| Fluoroelastomer | 100 | 100 | 100 | 100 |
| TAIC | 0 | 0 | 2.5 | 2.0 |
| 6-FDA-Bis(N-allyl) | 4.2 | 0 | 0 | 0 |
| ODPA-(Bis-allyl) | 0 | 3.2 | 0 | 0 |
| Peroxide$^1$ | 4.0 | 4.0 | 2.5 | 2.5 |
| Zinc Oxide | 6.0 | 6.0 | 6.0 | 6.0 |
| MT Carbon Black | 30 | 30 | 30 | 30 |
| Curing Characteristics | | | | |
| $M_L$, dN · m | 0.80 | 0.80 | — | 0.84 |
| $M_H$, dN · m | 15.9 | 15.1 | — | 16.7 |
| ts1, minutes | 0.47 | 0.47 | — | 0.45 |
| t90, minutes | 1.45 | 1.70 | — | 1.65 |
| Stress-Strain | | | | |
| M100, MPa | 4.8 | 4.2 | 4.7 | 4.0 |
| $T_B$, MPa | 21.4 | 18.8 | 19.8 | 21.0 |
| $E_B$, % | 290 | 255 | 245 | 270 |
| Hardness, Durometer A | 72 | 72 | 71 | 71 |
| Compression Set | | | | |
| 70 hours @ 150° C. | 34 | 34 | 32 | 33 |

$^1$45% 2,5-dimethyl-2,5-di(t-butyl peroxy)hexane (DBPH) and 55% inert filler available as Luperco ® 101XL from ATOFINA

Example 3

Curable compositions of the invention were made by mixing Fluoroelastomer B, with the coagent prepared in Example 1, an organic peroxide, Proton Sponge® acid acceptor (available from Aldrich), carbon black and titanium dioxide on a conventional two-roll rubber mill, using standard mixing techniques employed in the elastomer industry. Control curable compositions were made by the same procedure except that a coagent of the prior art, trimethallyl isocyanurate (TMAIC), was used in place of the coagent prepared in Example 1. The compositions of this invention, containing the coagent made in Example 1, were much easier to mix than were the control compositions that contained TMAIC coagent. The formulations are shown in Table II.

Curing characteristics were measured by MDR (at 177° C., 0.5° arc, 15 minutes) according to the Test Methods. Stress-strain properties were measured at 23° C. on dumbbells that had been press cured at 177° C. for 2–12 minutes, followed by an oven post cure of 8 hours at 260° C. under an inert nitrogen atmosphere. Compression set was measured on o-rings that had been cured in the same manner as the dumbbells. The results are also shown in Table II.

TABLE II

| Formulation, phr | Control Sample C | Sample 3 | Sample 4 | Sample 5 | Sample 6 |
|---|---|---|---|---|---|
| Fluoroelastomer B | 100 | 100 | 100 | 100 | 100 |
| MT Carbon Black | 15 | 15 | 15 | 15 | 15 |
| Proton ® Sponge | 0.1 | 0.1 | 0.1 | 0.1 | 0.1 |
| TiO$_2$ | 0.2 | 0.2 | 0.2 | 0.2 | 0.2 |
| TMAIC | 2 | 0 | 0 | 0 | 0 |
| 6-FDA-Bis(N-Allyl) | 0 | 2 | 4 | 4 | 4 |
| Peroxide[2] | 3 | 3 | 3 | 4 | 5 |
| Curing Characteristics | | | | | |
| $M_L$, dN · m | 3.35 | 4.25 | 3.25 | 3.12 | 2.46 |
| $M_H$, dN · m | 31.7 | 16.4 | 20.6 | 21.5 | 24.3 |
| ts2, minutes | 1.07 | 0.57 | 0.52 | 0.48 | 0.37 |
| t90, minutes | 5.60 | 2.07 | 1.83 | 1.38 | 1.03 |
| Stress-Strain | | | | | |
| M100, MPa | 8.1 | 5.6 | 8.7 | 7.7 | 7.6 |
| $T_B$, MPa | 15.9 | 18.0 | 19.1 | 17.3 | 18.3 |
| $E_B$, % | 156 | 191 | 171 | 177 | 188 |
| Hardness, Shore A | 77 | 71 | 75 | 78 | 78 |
| Compression Set | | | | | |
| @ 200° C., 70 hours | 27 | 37 | 36 | 37 | 41 |
| @ 250° C, 70 hours | 53 | 60 | 53 | 54 | 64 |

[2]PLC (DBPH)-68: 68% DBPH on an inert carrier available from Elastochem.

Comparative Example

The curing behavior of fluoroelastomer compositions containing TMAIC coagent was compared with that of fluoroelastomer compositions containing N,N'-diallylpyromellitic diimide (PMDA-Bis(N-Allyl)) coagent, an aromatic diimide coagent having a relatively rigid structure that is not used in the compositions of this invention. The PMDA-Bis(N-Allyl) was synthesized from pyromellitic dianhydride generally according to the process of Example 1.

Control curable compositions were made by mixing Fluoroelastomer B with coagent, an organic peroxide, Proton Sponge® acid acceptor (available from Aldrich), and carbon black on a conventional two-roll rubber mill, using standard mixing techniques employed in the elastomer industry. The formulations are shown in Table III.

Curing characteristics were measured by MDR (at 177° C., 0.50 arc, 24 minutes) according to the Test Methods.

As shown in Table III, the cure rate (as indicated by peak rate and t90) was inferior for the compositions containing the rigid aromatic diimide coagent compared to that for compositions containing the TMAIC. Yet, as shown in Tables I and II, the cure rate of the flexible diimide coagents employed in this invention are similar to that of TAIC and TMAIC for fluoroelastomer compositions. Also, comparing the cure state ($M_H$-$M_L$) for fluoroelastomer compositions of the invention (Samples 3–6 in Table II) with that of fluoroelastomer compositions cured with the rigid diimide coagent (Control Samples E–F in Table III ), it is seen that a desirably higher cure state is obtained from the flexible diimide coagents employed in the compositions of this invention. It is surprising that the rigid aromatic diimide coagent is so inferior in crosslinking fluoroelastomer compositions than the similar, but flexible aromatic diimide coagents that are employed in the compositions of the invention.

TABLE III

| Formulation, phr | Control Sample D | Control Sample E | Control Sample E | Control Sample F |
|---|---|---|---|---|
| Fluoroelastomer B | 100 | 100 | 100 | 100 |
| Mt Carbon Black | 15 | 15 | 15 | 15 |
| Proton Sponge ® | 0.5 | 0.5 | 0.5 | 0.5 |
| TMAIC | 3 | 0 | 0 | 0 |
| PMDA-Bis(N-Allyl) | 0 | 3 | 3 | 4 |
| Peroxide[1] | 3 | 3 | 4 | 4 |
| Curing Characteristics | | | | |
| ML, dN · m | 3.88 | 3.43 | 3.62 | 3.76 |
| MH, dN · m | 24.86 | 10.58 | 11.83 | 12.02 |
| ts2, minutes | 0.58 | 3.23 | 2.43 | 2.52 |
| t90, minutes | 7.30 | 12.10 | 10.48 | 10.50 |
| Peak Rate, dN · m/minute | 8.03 | 1.45 | 1.88 | 1.76 |

[1]Luperco 101XL available from ATOFINA

What is claimed is:

1. A free radical-curable composition comprising:
   A) fluoroelastomer having cure sites selected from the group consisting of bromine atoms, chlorine atoms, iodine atoms, nitrile groups, non-conjugated dienes, and mixtures of two or more thereof; and
   B) a coagent having the general formula

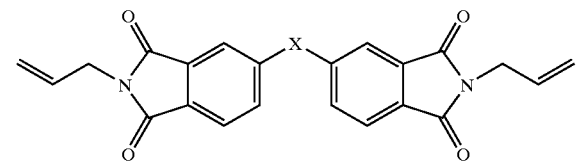

where X is $C(CF_3)_2$, $C(Rf)_2$, $(CF2)_n$, O, CO, S, or Rf; and wherein Rf is a $C_1$–$C_4$ perfluoroalkyl group, Rf is a perfluorooxyalkylene group having 2 to 4 carbon atoms, and n is an integer from 1 to 8.

2. A free radical-curable composition of claim 1 further comprising an organic peroxide.

3. A free radical-curable composition of claim 2 further comprising an acid acceptor.

4. A free radical-curable composition of claim 1 wherein X is $C(CF_3)_2$.

5. A free radical-curable composition of claim 1 wherein X is O.

6. A free radical-curable composition of claim 1 wherein the fluoroelastomer is a copolymer comprising copolymerized units of vinylidene fluoride.

7. A free radical-curable composition of claim 1 wherein the fluoroelastomer is a copolymer comprising copolymerized units of tetrafluoroethylene.

8. A free radical-curable composition of claim 1 wherein the fluoroelastomer is a copolymer comprising copolymerized units of a perfluoro(alkyl vinyl ether).

9. A free radical-curable composition of claim 1 wherein at least one cure site is selected from the group consisting of copolymerized brominated olefins, chlorinated olefins, iodinated olefins and olefins having a nitrile group.

10. A free radical-curable composition of claim 1 wherein at least one cure site is selected from the group consisting of copolymerized brominated unsaturated ethers, chlorinated unsaturated ethers, iodinated unsaturated ethers and unsaturated ethers having a nitrile group.

11. A free radical-curable composition of claim 1 wherein at least one cure site is selected from the group consisting of copolymerized non-conjugated dienes.

12. A free radical-curable composition of claim 1 wherein at least one cure site is selected from the group consisting of iodine atoms, bromine atoms and mixtures thereof that are present at terminal positions on fluoroelastomer polymer chains.

13. A coagent of the formula

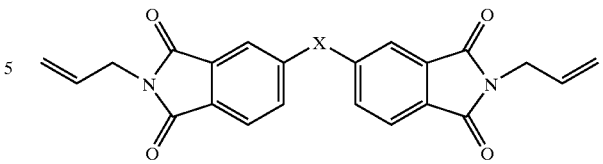

where X is $C(CF_3)_2$.